United States Patent
Wagner et al.

[11] Patent Number: 5,950,180
[45] Date of Patent: Sep. 7, 1999

[54] PROCESS FOR THE CLASSIFICATION OF OBJECTS

[75] Inventors: Thomas Wagner, Erlangen; Friedrich Böbel, Uttenrueth; Norbert Bauer, Erlangen; Hermann Haken, Stuttgart, all of Germany

[73] Assignee: Fraunhofer-Gesellschaft zur Forderung der angwandten Forshung e.v., Munich, Germany

[21] Appl. No.: 08/530,381

[22] PCT Filed: Apr. 11, 1994

[86] PCT No.: PCT/DE94/00396

§ 371 Date: Oct. 10, 1995

§ 102(e) Date: Oct. 10, 1995

[87] PCT Pub. No.: WO94/24635

PCT Pub. Date: Oct. 27, 1994

[30] Foreign Application Priority Data

Apr. 10, 1993 [DE] Germany .............................. 43 11 557

[51] Int. Cl.$^6$ ...................................................... G06F 15/18
[52] U.S. Cl. .................................. 706/14; 706/16; 706/17; 706/25
[58] Field of Search .................................. 395/23, 22, 20; 706/16–17, 25, 14

[56] References Cited

U.S. PATENT DOCUMENTS

| | | | |
|---|---|---|---|
| 4,965,725 | 10/1990 | Rutenberg | 382/224 |
| 5,216,750 | 6/1993 | Smith | 706/18 |
| 5,295,197 | 3/1994 | Takenaga et al. | 382/158 |
| 5,555,439 | 9/1996 | Higashino et al. | 706/25 |
| 5,619,589 | 4/1997 | Otsu et al. | 382/160 |

OTHER PUBLICATIONS

Hermann Haken, "Synergetic Computers and Cognition, A Top–Down Approach to Neural Nets", pp. 36–59, (1991).

*Primary Examiner*—Tariq R. Hafiz
*Attorney, Agent, or Firm*—Antonelli, Terry, Stout & Kraus, LLP

[57] ABSTRACT

A method of classifying objects in a system having an electrical signal receiver scans the objects to be classified and outputs for each object M scanned values, and an evaluation unit evaluates the M scanned values and classifies the objects into classes. Classification takes place by performing a learning process to learn adjoint prototypes corresponding to the classes, wherein an adjoint prototype is learned for each of the classes through minimization of a potential function. A classifying process is then performed wherein an object to be classified is assigned to one of the classes, according to a potential function, corresponding to the learned adjoint prototypes.

16 Claims, 10 Drawing Sheets

FIG. 2a
FIG. 2b
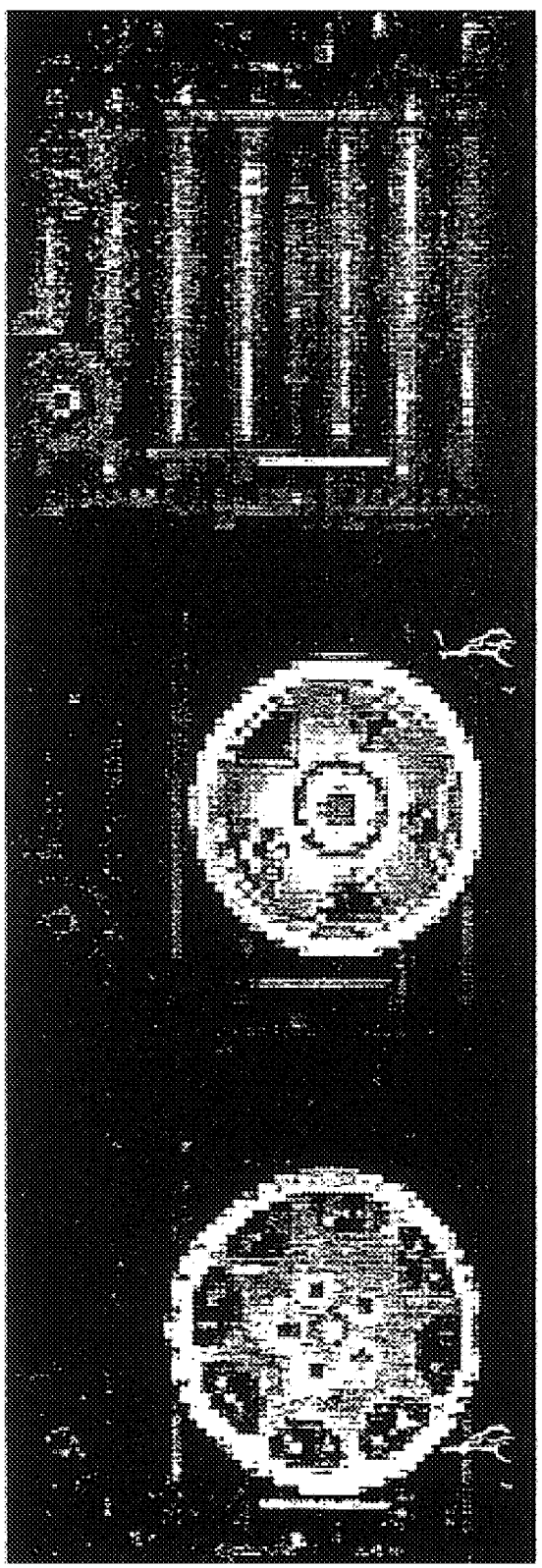
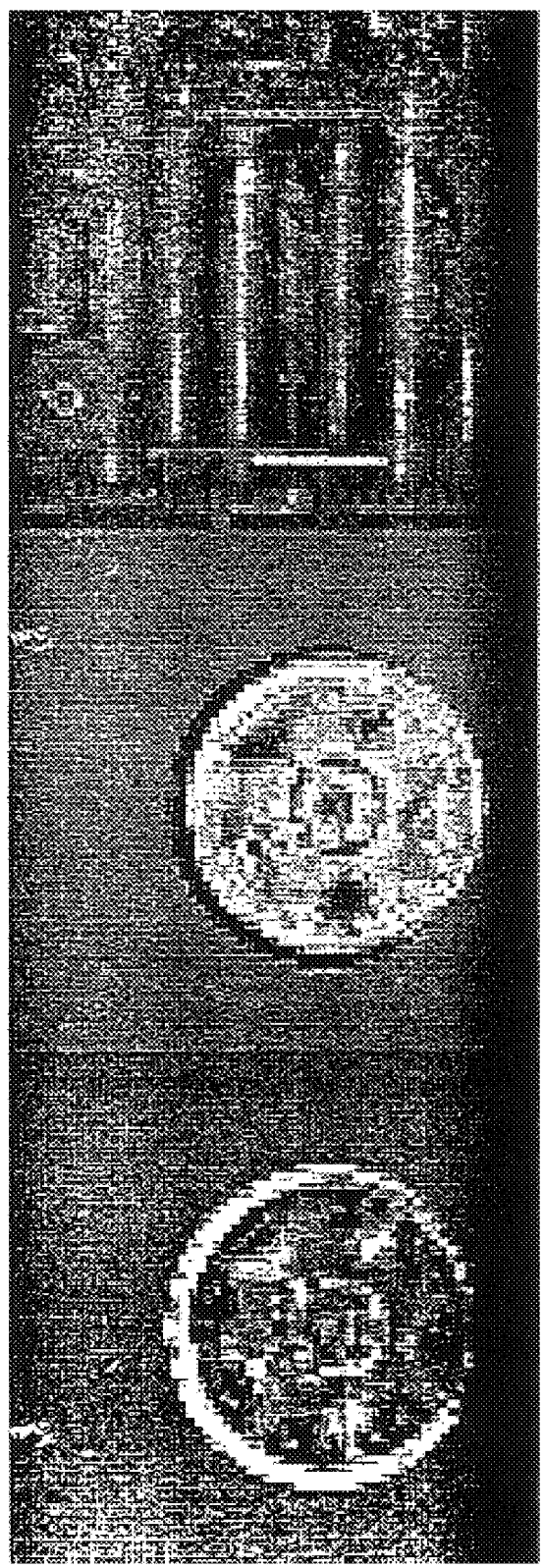

TIME OF LEARNING

PROCESS FOR THE CLASSIFICATION OF OBJECTS

BACKGROUND OF THE INVENTION

The present invention relates to a process for the classification of objects using an electric signal receiver which scans the objects to be classified and delivers for each object M scanned values, which are applied to an evaluation unit.

At many stages of an industrial production process, previous identification is required for adequate processing or inspection of a workpiece. The employed identification process should have a high as possible identification rate while at the same time a low as possible number of false classifications. The parts to be identified have to be identified independent of their position or their orientation. Moreover, soiling or deviation from the desired shape must not significantly influence identification performance. Furthermore, the system has to be able to compensate for slow changes in the ambient conditions, such as, e.g. light, due to a followup learning process during identification.

For economical reasons, the hardware of the identification system has to be as simple as possible; nonetheless sufficiently short identification times have to be feasible.

Another significant problem in automatic production is classification; classification algorithms are an important tool in quality control: good and poor pieces of a production process have to be separated. Usually, in particular, the error rate in failing to recognize poor pieces (if need be at the expense of the recognition rate of good pieces) has to be kept small.

Classification algorithms have to have the same insensitivities as the identification algorithms, by way of illustration, regarding position and orientation of the workpiece, their illumination and soiling, etc.

Hitherto either conventional pattern processing procedures or neuronal nets have been utilized for identification or classification.

For acceleration, conventional processes and neuronal nets usually employ features extracted from the pattern data. Then a classification or identification algorithm continues to work with the aid of these extracted features. It is disadvantageous is first of all, that the selection of problem-specific features is relatively complicated; and secondly, the followup learning capability during the process is small.

Neuronal nets have been used in an attempt to solve the problem of the lack of followup learning. However, with neuronal nets (as with learning input), learning times have to be taken into account which, with the presently available hardware, prevent use in a real-time identification system.

Conventional identification and classification process, therefore, require either complicated hardware for the image recording system and the evaluation system or show relatively poor identification respectively classification performance.

SUMMARY OF THE INVENTION

An object of the present invention is to provide a process for classifying objects using an electrical signal receiver, which scans the object to be classified and delivers for each object M scanned values, which are applied to an evaluation unit, which permits a pattern recognition which meet industrial needs.

A solution to this object is provided by the present invention, as follows.

Further embodiments of the present invention are also provided.

In the process of the present invention for the classification of objects using an electric signal receiver which scans object to be classified and delivers for each object M scanned values, which are applied to an evaluation unit, has a learning step in which by minimization of a potential function for each of i object classes an adjoint prototype is learned, in which class-specific features are contained intensified and suppressed for differenciating irrelevant between i object classes, and a classification step, in which with the aid of another potential function an object to be classified is unequivocally assigned to one of the learned adjoint prototypes.

An element of the present invention is that in order to learn the adjoint prototype per class, j>1 learning objects are utilized and each adjoint prototype combines class-specific features of all the j learning objects of the class and in order to assign a scanned object to a class, a potential function is formed from the learned prototype, the minimum of which is assigned to the adjoint prototype which coincides the most with the to-be-classified object.

For classifying of objects in one of the i classes, the sequences of M scanned values obtained from this object are assigned unequivocally to one minium by a synergetic process.

The process of the present invention yields an industrially usuable identification and classification system for input data from any sensors operating according to optical, acoustical or other principles. The evaluation process is based, independent of sensor type, on synergetic principles.

Synergetics, a science founded by H.Haken, differs from conventional or neuronal pattern processing principles by utilizing principles of self-organisation, originally developed for explaining pattern formation in lifeless nature. Reference hereto is made to "Synergetics, an Introductions", Haken, H, Springer, Berlin, 1983.

Investigations of synergetic phenomena in the field of perception has shown that many motor and cognitive behavioral patterns can also be successfully described using a synergetic approach. This is decribed in "Synergetics of Cognition", Haken, H. Springer, Berlin, 1990".

However, Haken confines his investigation of synergetic phenomena to a discussion of autoassociative properties—H. Haken, "Synergetic Computers and Cognition. A Top-Down Approach to Neural Nets", Springer, Berlin, 1991. This paper merely shows that a grainy image can be restored with synergetic processes. A system on a synergetic basis that can be utilized in industry has hitherto not been described. without any specific application in mind can be utilized for solving the industrial problems of "identification and classification".

For this purpose, Haken's generally described synergetic algorithms are further developed in such a manner that the algorithms now can take into account multiple representations respectively of patterns per class during learning input. Thus, with the aid of learning patterns the process of the present invention can also recognize not previously encountered test patterns.

Furthermore, the process of the present invention also permits supervised learning.

The synergetic algorithms are additionally able to separate essential features from nonessential ones and carry out a separation of patterns, such as, e.g., cast parts from the background. The term background is not confined to only optical patterns; in the case of, e.g., acoustical data, a synergetic classification process can also independently suppress features (Fourier coefficients) not needed for class separation.

Compared to conventional processes, synergetic processes are distinguished by little susceptibility to signal interference, short learning input times, short followup learning times, possible obviation of the selection of signal features and independency of background.

Synergetic algorithms can, in particular, be utilized for automatic calculation and selection of relevant features from the input data offered to it. The algorithm is offered images of scratched and unscratched surfaces, which the algorithm automatically recognizes. The data material offered to it can be therefore divided into two classes; in particular the features can be calculated automatically permitting corresponding separation. The just calculated features can then be employed as input data for the next synergetic layer.

The multistage process of the present invention is, moreover, able to adequately solve even complex, i.e., nonlinear-separable problems.

In this way, a limitation of Haken's synergetic computer can be overcome for, similar to the transition from a single-layer perception to multilayer perception, there is no longer a limitation to linear-separable problems.

The process of the present invention can be realized using conventional computers, which are programmed in the manner Haken described respectively set forth within the scope of the present description. Furthermore, it is, of course, possible to realize the invented process by utilizing special components as, by way of illustration, described in DE 42 36 644 A1.

BRIEF DESCRIPTION OF THE DRAWINGS

The present invention is made more apparent in the following with reference to the drawings, showing in:

FIGS. 2a and 2b original images and adjoint prototypes,

DESCRIPTION OF PREFERRED EMBODIMENTS

The process of the present invention is described in the following by way of example using an optical identification system for wheels of respective wheel rims, which system recognizes and respectively classifies wheel rims during a production process independent of position and orientation.

Figure 1:
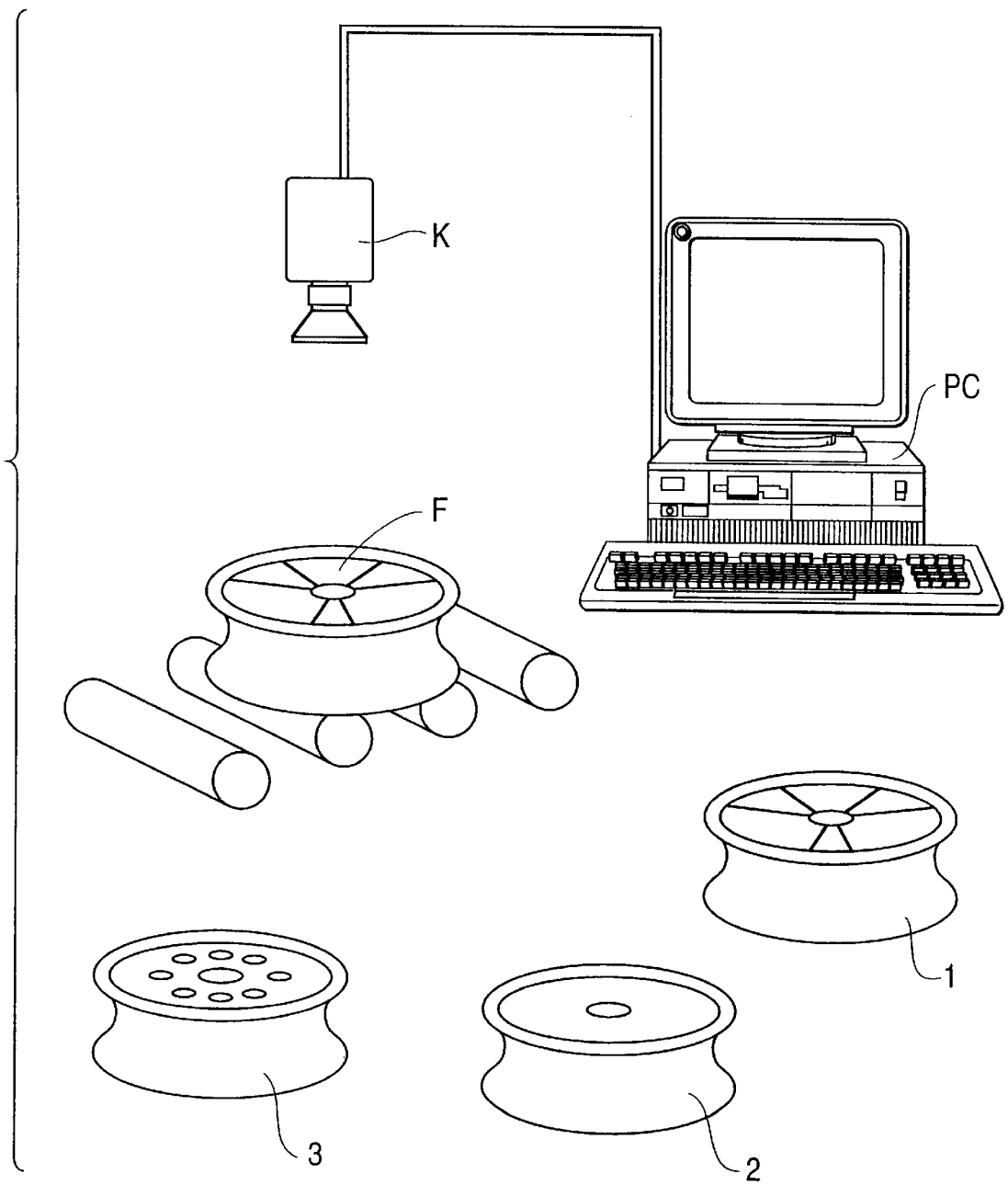
FIG. 1 the setup of an identification system utilized in the invented process.

FIG. 1 shows the setup of the identification system. It is composed of a camera K for image recording, such as e.g., a CCD camera, a frame-grabber card for reading images into a computer PC, the computer PC for the actual image evaluation.
The numbers 1, 2 and 3 stand for different types of wheel rims to be recognized and classified. The letter F stands for a wheel rim in the recording position.

The evaluation process controlled and carried out by the computer PC is divided into the following steps:

image recording image preprocessing initial learning input identification followup learning In image recording, the image from the CCD camera K is read into the computer PC by means of the frame-grabber card. The frame-grapper card used here works with a resolution of 768*512 pixel. The trigger impulse for recording can come from either a light bar or a SPS connection for example. It is just as feasible to permit continuous image recording in which blanks are recognized into a separate class.

Image preprocessing is divided into multiple image-to-image transformations which are carried out successively in order to simplify the operation of the classifier. Transformations of this type are described, by way of illustration, in the book "Digital Image Processing" by B. Jähne, 2nd edition, Springer, Berlin, 1983 or in the book "Pattern Classification and Scene Analysis" by P. Duda and P. Hart, Wiley & Sons, New York, 1973.

In the process described by way of example, then a reduction of the image occurs, in the present instance to 65*64 pixel, because this accelerates further processing without deteriorating the results.

In other preprocessing steps, an image translation invariance and rotation invariance is achieved. There are several possibilities for this, such as the following a combination of a 2-dimensional fast Fourier transformation for the translation invariance, the subsequent transformation into the polar coordinate representation by means of bilinear interpolation and finally a one-dimensional Fourier transformation on the angle coordinate in order to achieve a rotation invariance, a separation of the image (the wheel rim) from the background, subsequent moving into the gravity center, due to which the translation invariance is achieved and transformation into polar coordinates with one-dimensional Fourier transformation on the angle coordinate for the rotation invariance.

The image vectors themselves are normed prior to and following the transformations to a length 1 in order to remain in a stable range.

Initial learning input operates according to Haken's matrix inversion process. In order to obtain a better representation of the random learning sample, the process described by Haken is modified in that the average of several patterns per class is employed as a prototype.

As an alternative, a supervised synergetic learning process can also be employed as will be described. So called adjoint prototypes are returned as the result of the learning process.

FIG. 2a shows the original images of the wheel rims, whereas FIG. 2b depicts the adjoint prototypes with automatic background suppression.

A to-be-recognized pattern is exposed to the same preprocessing steps as the learning pattern. Following this, the scalar products of these transformed patterns are formed with all the adjoint prototypes. Favored is the class having the valuewise highest scalar product.

The use of the supervised learning process created from a modification of Haken's supervised learning process by setting only the attention parameter of the desired target class to 1 and all the other attention parameters to 0 permits utilizing recognized patterns in order to alter the adjoint prototypes after each learning stage and in this manner easily compensate drifting of the recording parameters, such as e.g., illumination.

In the following, the process of the present invention is described in detail:

As previously explained, synergetic algorithms are employed for evaluating the input data and classification. This is distinguished by following the same dynamics as are found in natural self-organization processes. Coupling between the individual components of the systems either occurs in the form of global coupling or local reciprocal action between the system components (e.g. mechanical forces between the liquid particles in the creation of Benard convection rolls). A Fokker-Plank equation $$\dot{f}(q, t) = -\frac{\partial}{\partial q}(Kt) + \frac{1}{2}\frac{Q\partial^2 f}{\partial q^2}$$

serves as the mathematical basis for the description of synergetic phenomena.

Mathematical description of synergetic processes are found in H. Haken's aforementioned publications to which, moreover, reference is explicitedly made with regard to all terms not explained in more detail herein.

With these differential equations forming the basis of the synergetic processes, a dynamic can be constructed with the aid of single stage supervised or unsupervised as well as multistage synergetic classification processes.

Each learning process has its own special field of application:

A supervised learning process is selected if, e.g., differently shaped parts are each to be assigned to a specific class. In a training phase, several representations of each class are shown and learned. During this learning input process, the computer carrying out the invented process creates so-called adjoint prototypes, in which unimportant features have been suppressed.

The embodiment in FIG. 2 shows how such a synergetic learning process is able to automatically eliminate unimportant features in the learned adjoint prototypes, wheel rims in the depicted embodiment. The background of the images, which is the same in all three classes, does not supply any essential information and is therefore automatically suppressed in the wheel rim classes.

Contrary to Haken's approach, the process of the present invention permits learning input of more than one pattern into a single class. This is of major significance for practical applications, because a class usually cannot be completely characterized until the data of several learning examples have been given.

The simplest possible manner of collection is averaging all the learning patterns of one class. Even this simple process permits achieving drastic improvements in the recognition rate (SCAP process).

Another improvement possibility is yielded by iterative followup learning in which those patterns which could not be learned successfully in the previous SCAP step are offered in the next SCAP step with a higher weighing (SCAPAL process). In this way, the learning behavior no longer minimizes the residual errors of the system but rather the number of falsely learned patterns.

This learning process can be described as follows:

SCAP step:
First a normal SCAP algorithm is applied to the average values of the learning data and the classification rate is indicated on the random learning sample and test sample.

Calculation of improved prototypes:
All falsely classified patterns of the random learning sample are added up for each class and normed again to 1. These correction vectors are (following multiplication by a learning rate, i.e., a weighing factor amounting here to, e.g., 0.05) are added to the original average values. The result is again normed to 1.

New SCAP step:
To the vectors created in this manner, the SCAP algorithm is again applied and the recognition rate is indicated on the random learning sample and test sample.

Back to step 2, until the process converges:
convergence means that recognition performance on the random learning sample no longer continues to improve.

The use of recognition results, with what certainty is a pattern recognized? how far removed is it from the next class?, can it serve as a mass number with what weighing a pattern enters the next iteration step.

Figure 7:
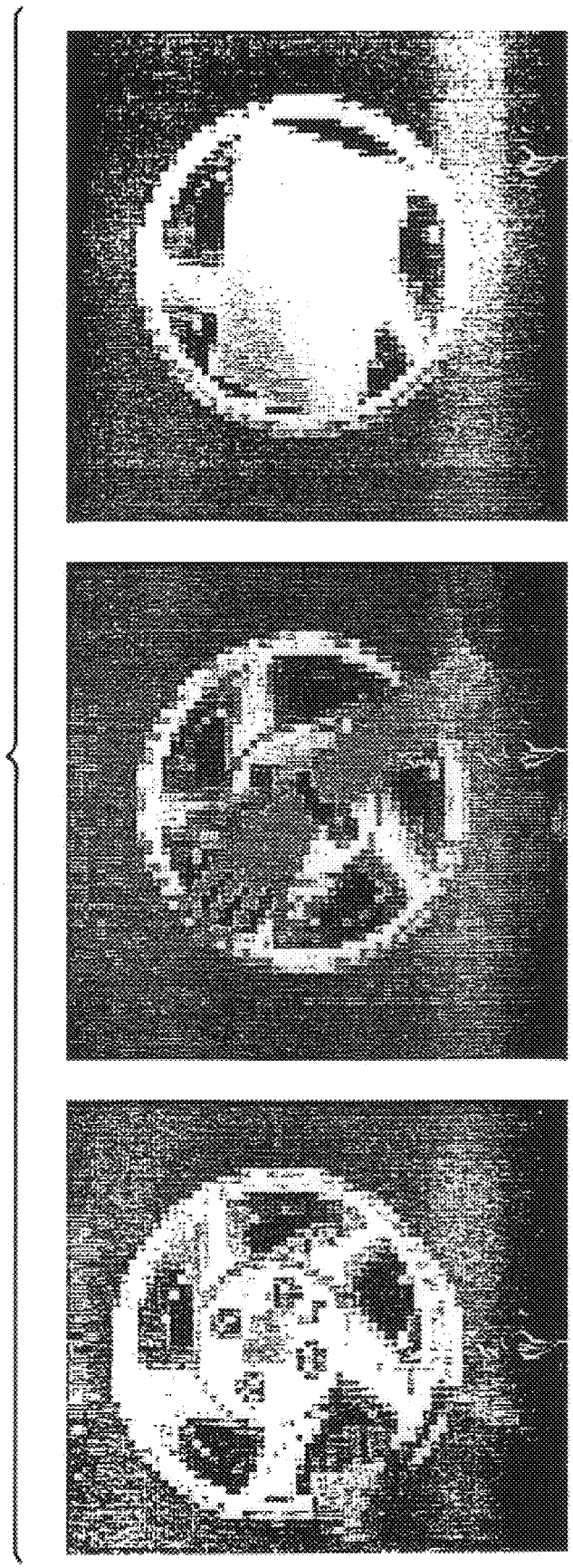

Recognition assumes, on the other hand, a synergetic recognition algorithm: which is robust against interferences. FIG. 7 shows examples of objects which can be correctly recognized inspite of tipping or being partially covered.

Another possible improvement is yielded by a MLSC process (multilayer synergetic computer). The MLSC process combines the advantages of (hitherto one-stage) synergetic computers and (multistage) perceptron nets which due to their multistageness can correctly classify nonlinear separable problems.

Figure 3:
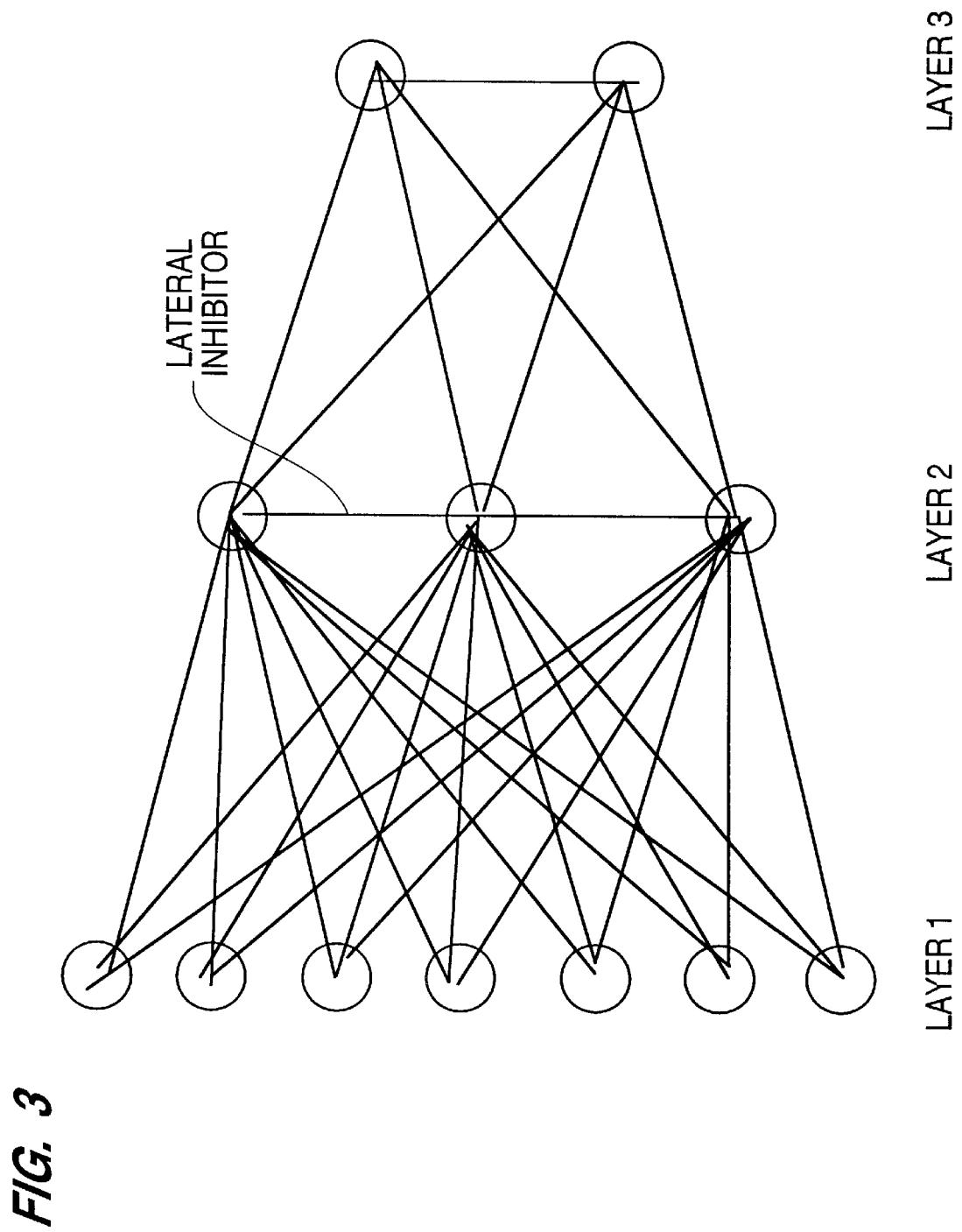
FIGS. 3, 4, 5, and 6 schematically the process steps in different variants of the invented process, FIG. 7 examples of tipped and partially covered recognized objects, FIGS. 8, 9 and 10 an example of a feature extraction.

FIG. 3 shows an example of the setup of a multistage synergetic MLSC process. Contrary to the topology of a, e.g., multilayer perceptron net, in each layer is a lateral inhibitor between the individual neurons (winner-take-all). Moreover, the learning behavior of the synergetic net is determined by global parameters, the so-called order parameters, which are not created until the self-organization process does.

The learning procedure occurs in such a manner that the second layer (hidden layer) completely learns the patterns from the first layer. Not until a mass value indicates that the learning procedure has ended, are the scalar products of the first layer conveyed to the nonlinearities and then passed on to the next layer. In this manner, features are extracted in the "hidden layer".

The nonlinearities in the coupling are extremely important, because linear coupling of multiple layers can always be expressed in a single layer and therefore has no advantages over a simple one-layer synergetic computer.

Moreover, it is useful to adapt the weighings between top layers using a supervised learning procedure.

An invented synergetic learning process (SSC for supervised synergetic computer) looks like this: instead of as in the unsupervised learning, setting all the so-called attention parameters in the learning differential equation equal to 1 (the same attention for each pattern class), only the parameter of the class into which the pattern is to be learned is set to 1 (greatest attention). All the others are set to 0 (least attention). In this way, the patterns can be forced into specific classes. The following differential equation system could be employed for supervised synergetic learning:

$$\dot{v}_k^+ = \lambda(v_k^+ q)q - B\sum_{k+k'}(v_k^+ q)(v_{k'}^+ q)q - C\sum_{k'}(v_k^+ q)(v_{k'}^+ q)^2 +$$

$$\gamma_1\left[2(v_k q)q^k \sum_{k'}(\bar{v}_k v_{k'})(v_{k'}^+ q)q) - \sum_{k'}(\bar{v}_k q)(\bar{v}_{k'} q)v_{k'}^+\right]$$

$$\dot{v}_k = \gamma_1\left[2(v_k^+ q)q - \sum_{k'}(v_{k'}^+ q)(v_k^+ q)v_{k'} - \sum_{k'}(v_k^+ \bar{v}_{k'} q)q\right]$$

Essentially, the individual terms of this equation system describe the learning target in the form of a minimizing energy function, as previously described in detail in H.Haken's "Synergetic Computers and Cognition. A Top-Down Approach to Neural Nets", Springer, Berlin, 1991.

An essential further improvement compared to the state of the art consists of not setting all the attention parameters always to 1, but rather only to select the parameter differing from 0, that belongs to the class of the just offered pattern. In this way, the learning behavior of the algorithm changes qualitatively. A previously unsupervised learning process turns into a supervised learning process.

Figure 4:
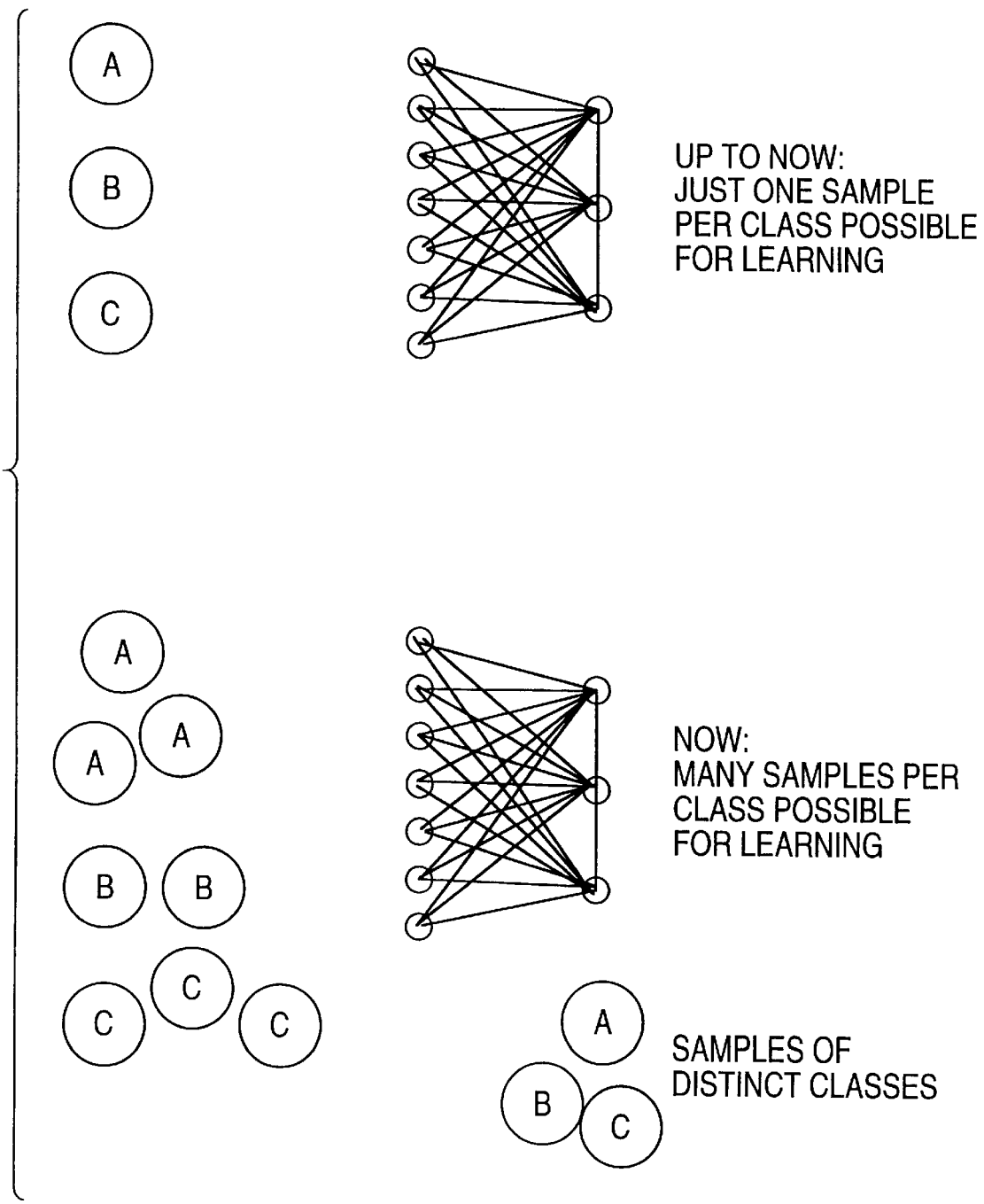
Figure 5:
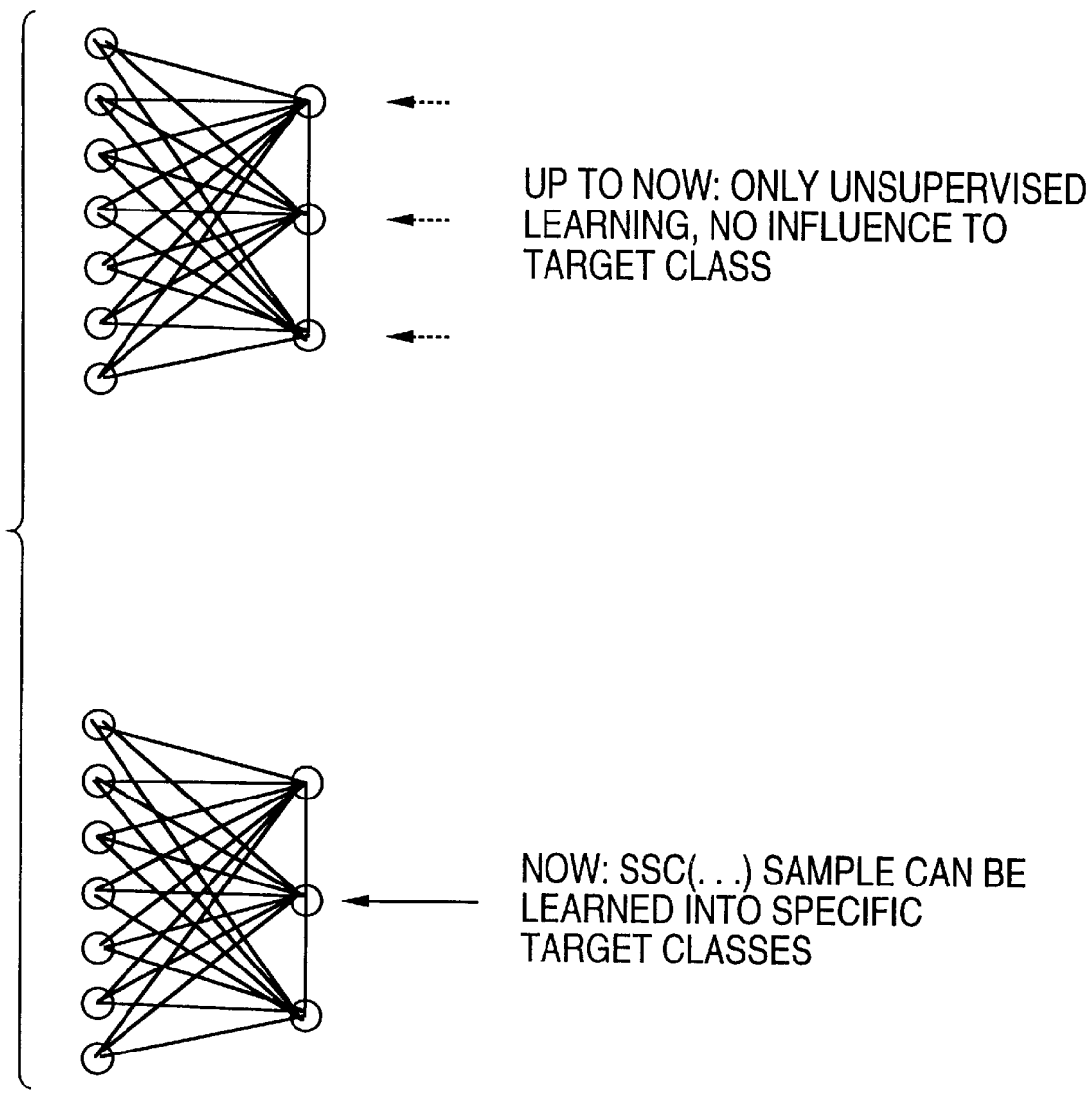
Figure 6:
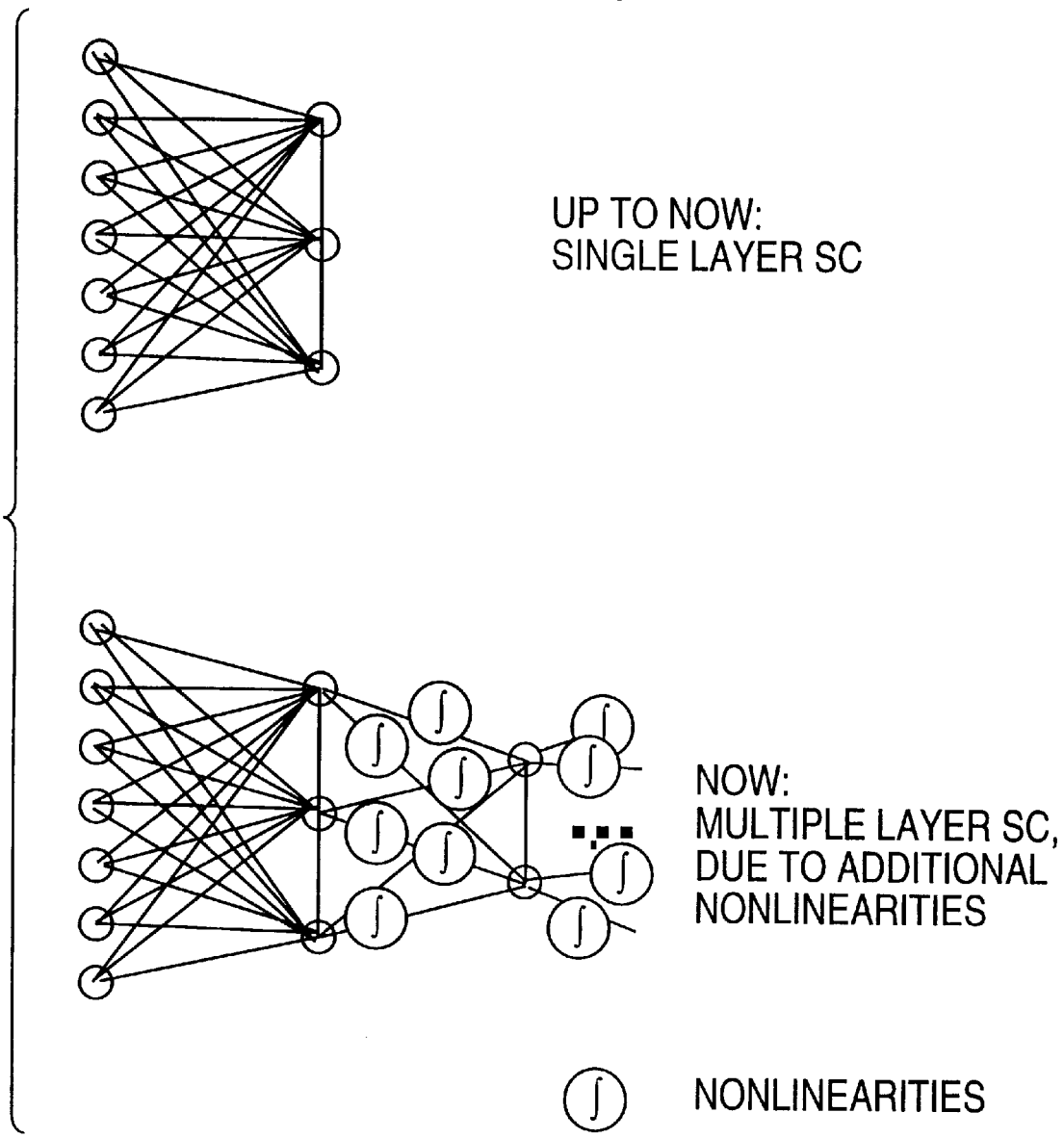

The aforedescribed processes are represented schematically in FIGS. 4 to 6.

It turned out that even in the event of tipping, partial covering or soiling, as shown in FIG. 7, with great probability the right type of wheel is determined.

Moreover, the system is able to compensate a drift in the ambient conditions (e.g., illumination) by a followup learning during the identification process. The background of the wheels plays no role in the recognition process.

In the event of a production change, the system is by way of illustration able to learn a new set of wheel classes without any long interruption of the process.

Important is the fact that no special telling features of the workpiece have to be determined for identification, as well as the short computing time which is also required for the actual learning algorithm.

The evaluation of the recorded images can occur without using special hardware. A synergetic process is utilized for the identification. Compared to conventional systems, this setup is distinguished by little susceptibility to image interferences short learning input times short followup learning times obviation of selecting problem-specific image features.

Another possible application of the invented process is the extraction of features. Unsupervised synergetic algorithms can be utilized in this manner in a first (feature-extracting) stage of a recognition system.

Figure 8:
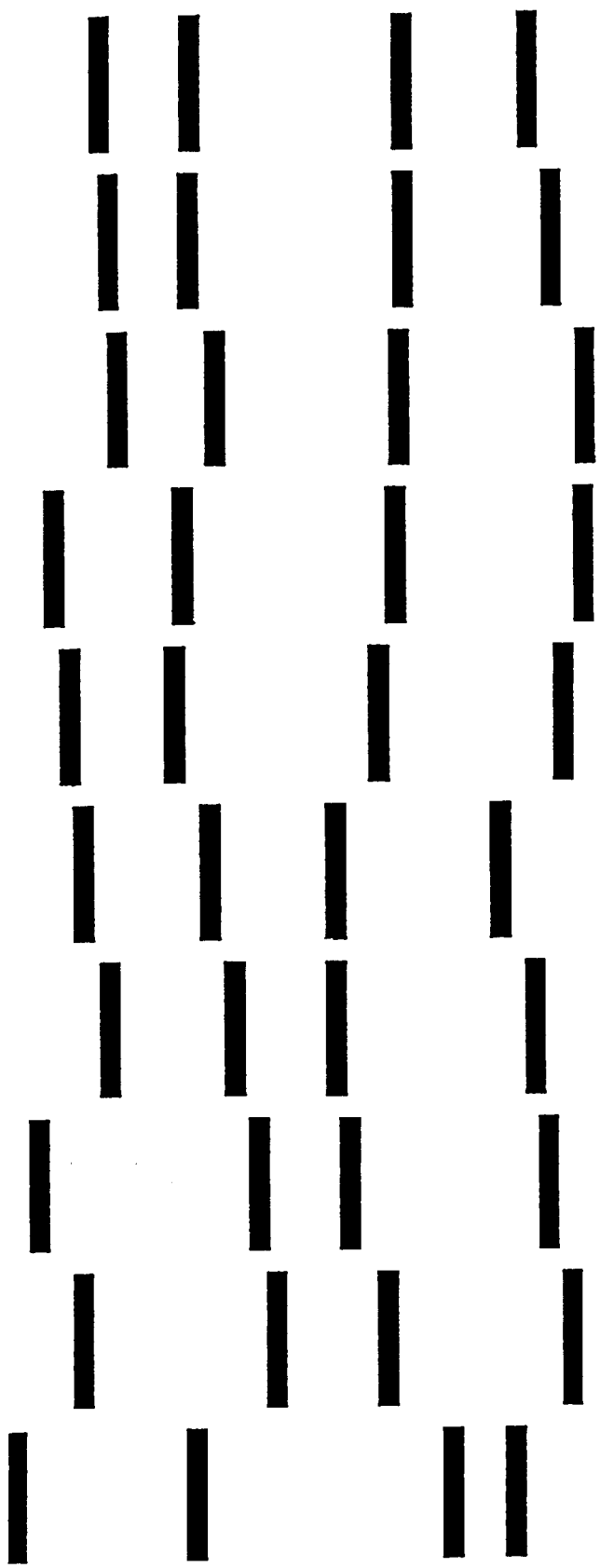
Figure 9:
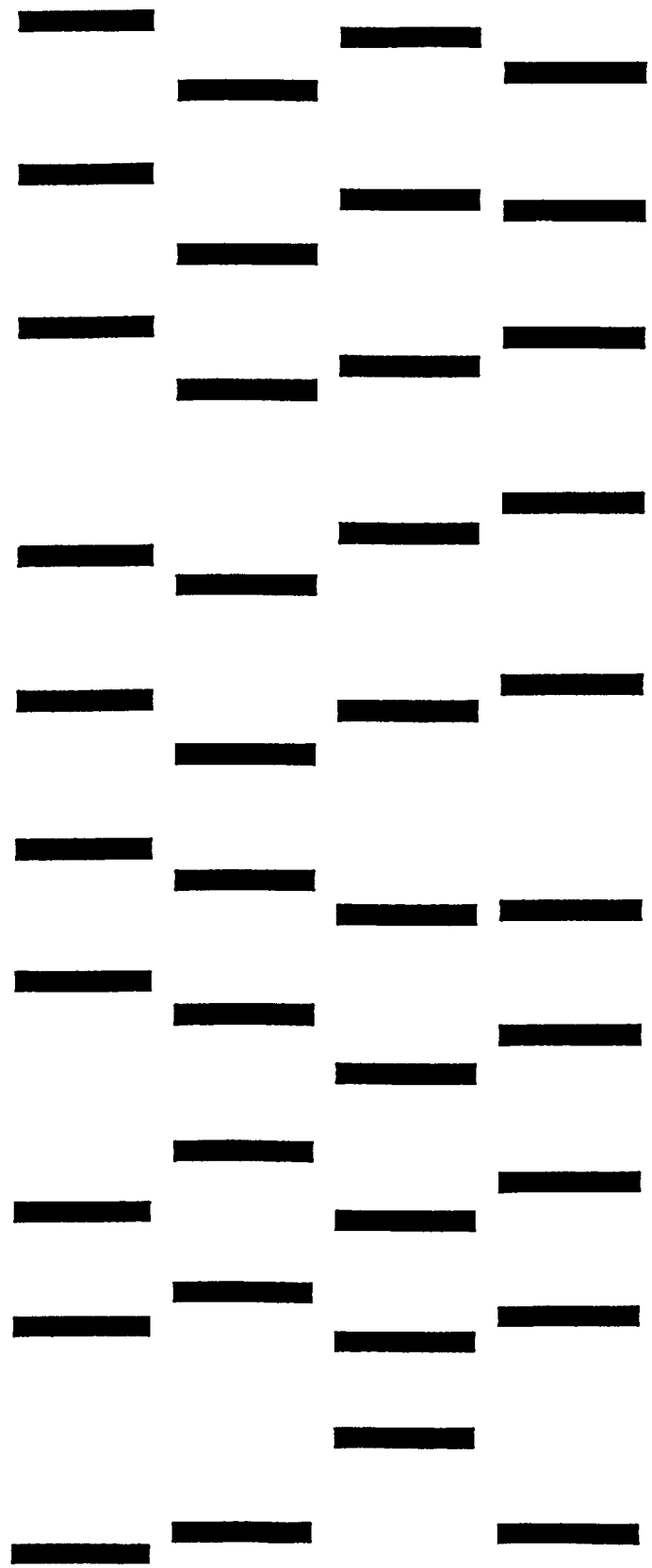
Figure 10:
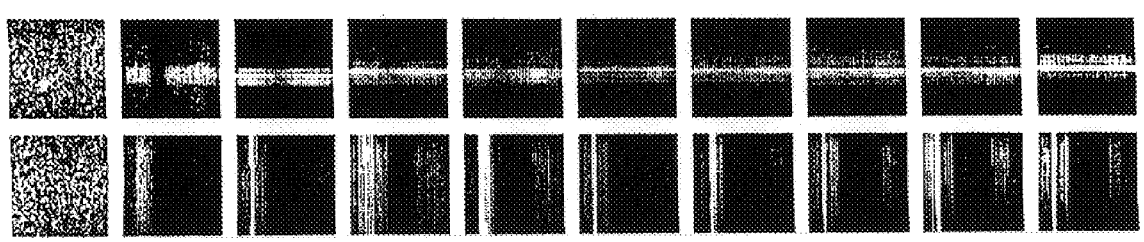

An example is shown in FIGS. 8, 9 and 10, in which an unsupervised synergetic algorithm extracts the features vertically and horizontally from by-chance-aligned lines. FIGS. 8 and 9 show vertical respectively horizontal lines which are offered as unsupervised learning data for the feature extraction. FIG. 10 shows that the two prototypes specialize automatically on one direction each, i.e. one feature each.

The present invention is described in the foregoing using a preferred embodiment without the intention of limiting the scope or spirit of the overall inventive idea within which, of course, a great many different modifications are possible:

Thus, instead of by means of a conventional computer, the invented process can be carried out using special synergetic hardware, e.g., the synistor described in DE 42 36 644 A1, with the aid of which the synergetic learning or recognition process can be carried out quicker if there is an industrial identification or classification problem than with conventional computers. Furthermore, it can also be combined with optical preprocessing steps.

Parallel computers can also be utilized for synergetic processes. Synergetic algorithms can be especially easily parallelized and therefore be implemented in parallel computers.

What is claimed is:

1. A method of classifying objects in a system having an electric signal receiver which scans the objects to be classified and outputs for each object M scanned values, and an evaluation unit which evaluates the M scanned values and classifies the objects into the classes, said method comprising the steps of:

performing a learning process to learn adjoint prototypes corresponding to the classes, said learning process comprising the steps of:

learning an adjoint prototype, by minimization of a potential function, for each of the classes, intensifying class-specific features contained in the classes, and suppressing features irrelevant for differentiating between the classes; and performing a classifying process to classify the objects into the classes, said classifying process comprising the steps of:

assigning an object to be classified, according to a potential function, to one of classes corresponding to the learned adjoint prototypes, wherein each adjoint prototype of each class is learned by utilizing j>1 learning objects and each adjoint prototype combines class-specific features of all said j learning objects of said class, and wherein a scanned object is assigned to a class corresponding to one of the adjoint prototypes when the potential function is at a minimum indicating that the one adjoint prototype most coincides with the scanned object.

2. The method according to claim 1, characterized by said learning process being a one-stage process.

3. The method according to claim 1, characterized by said learning process being a multistage process.

4. The method according to one of claims 1, 2 or 3 characterized by said learning process being a supervised process.

5. The method according to claim 4, characterized by, for realization of a supervised synergetic learning process, the "attention parameter" of the class in which a pattern is to be learned being set to one and all the other attention parameters being set to zero.

6. The method according to claim 1, characterized by, for automatic calculation and selection of relevant features from the input data, good parts and poor parts being offered as learning examples, said features being calculated from the scanned values of said parts, permitting corresponding separation.

7. The method according to claim 6, characterized by, said calculated features being utilized as input data for a next synergetic layer.

8. The method according to claim 6, characterized by more than one pattern being offered as said learning example for each class.

9. The method according to claim 8, characterized by averaging of all patterns of one class occurring (SCAP process).

10. The method according to claim 9, characterized by one iterating followup learning being carried out, in which those patterns which were not successfully learned in the previous SCAP step are offered with a greater weighing in the next SCAP step (SCAPAL process).

11. The method according to claim 8, characterized by a synergetic multilayer process being utilized for generating the prototypes in which multiple synergetic single layers are successively connected.

12. The method according to claim 11, characterized by said layers being coupled by nonlinearities.

13. The method according to claim 11 or 12, characterized by said layers being coupled with supervised and unsupervised learning processes.

14. The method according to claim 1, characterized by said potential function being obtained by solving a Fokker-Plank equation.

15. The method according to claim 1, characterized by the recorded image being optically and/or electronically preprocessed for separation and correction of varying angles of view.

16. Utilizing the method according to claim 1, for the feature extraction.

* * * * *